United States Patent
Flick

(10) Patent No.: US 8,092,673 B2
(45) Date of Patent: Jan. 10, 2012

(54) TREATMENT DEVICE FOR COOLING AND MAGNETICALLY TREATING LIQUID WITHIN A CONTAINER AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 973 days.

(21) Appl. No.: 12/046,812

(22) Filed: Mar. 12, 2008

(65) Prior Publication Data

US 2009/0230032 A1    Sep. 17, 2009

(51) Int. Cl.
*C02F 1/48*      (2006.01)
*B01D 35/06*   (2006.01)

(52) U.S. Cl. ..... 210/138; 62/457.4; 62/457.8; 99/277.1; 210/85; 210/175; 210/222; 210/695

(58) Field of Classification Search ............... 62/457.4, 62/457.8; 99/277.1; 210/85, 138, 175, 222, 210/695
See application file for complete search history.

(56) References Cited

U.S. PATENT DOCUMENTS

| | | | |
|---|---|---|---|
| 3,692,616 A | 9/1972 | Stenstrom | |
| 4,872,401 A | 10/1989 | Lee | 99/275 |
| 5,647,974 A * | 7/1997 | Shim et al. | 210/138 |
| 5,860,353 A | 1/1999 | Ceccarani | 99/277.1 |
| 5,997,812 A | 12/1999 | Burnham et al. | 422/24 |
| 6,287,614 B1 | 9/2001 | Peiffer | 426/237 |
| 6,325,942 B1 | 12/2001 | Freije, III | 210/695 |
| 6,390,319 B1 | 5/2002 | Yu | 220/230 |
| 6,397,624 B1 * | 6/2002 | Horwell | 62/457.8 |
| D500,118 S | 12/2004 | Flick | D23/207 |
| D511,198 S | 11/2005 | Flick | D23/207 |
| 6,959,640 B2 | 11/2005 | Flick | 99/277.1 |
| 2005/0011363 A1 | 1/2005 | Janczak et al. | 99/277.1 |
| 2005/0086947 A1 | 4/2005 | Minoura | 62/177 |
| 2007/0108144 A1 | 5/2007 | Flick | 211/74 |
| 2009/0223879 A1 * | 9/2009 | Flick | 210/85 |
| 2010/0170838 A1 * | 7/2010 | Falcone | 210/222 |

FOREIGN PATENT DOCUMENTS

| | | |
|---|---|---|
| DE | 20208666 | 8/2002 |
| WO | 96/27302 | 9/1996 |

* cited by examiner

*Primary Examiner* — David A Reifsnyder
(74) *Attorney, Agent, or Firm* — Allen, Dyer, Doppelt, Milbrath & Gilchrist, P.A.

(57) ABSTRACT

A treatment device for magnetically treating liquid in a liquid container includes a container holder to receive the liquid container. An active cooling unit is associated with the container holder to cool the liquid within the liquid container. At least one magnet associated with the container holder to generate a magnetic field within the liquid in the liquid container.

23 Claims, 2 Drawing Sheets

TREATMENT DEVICE FOR COOLING AND MAGNETICALLY TREATING LIQUID WITHIN A CONTAINER AND ASSOCIATED METHODS

FIELD OF THE INVENTION

The present invention relates to the field of magnetic treatment, and more particularly, to the field of magnetically treating liquids to change properties thereof and associated methods.

BACKGROUND OF THE INVENTION

It is recognized that the flavor of some beverages may be enhanced by exposure to a magnetic field, which alters the molecular properties. U.S. Pat. No. 6,287,614 to Peiffer, for example, describes reducing the sensory perception of acids and tannins in alcoholic beverages by treating the beverage with a magnetic field. This treatment is asserted to give the alcoholic beverage a more aged flavor.

Accordingly, a number of products have been developed to expose beverages to magnetic fields to enhance flavor. Some of these products also attempt to enhance user convenience when magnetically treating beverages. For example, U.S. Pat. No. 4,872,401 to Lee discloses a container including surrounding sidewalls that have a plurality of magnets mounted on the inner side of the surrounding sidewalls to improve the flavor of fermented substances, such as wine, sauce, and tobacco. Another example is illustrated in U.S. Pat. No. 6,390,319 to Yu, which discloses a beverage magnetizing container that exposes a beverage within the container to a magnetic field to promote preservation. The magnetic field is created by permanent magnets in the sidewalls, base, or cap of the container.

Other products magnetically treat beverages during initial processing. For example, U.S. Pat. No. 6,325,942 to Freije, III discloses a liquid treatment unit that includes a pipe having a plurality of magnets coupled thereto. The magnets treat liquid as it passes through the pipes. U.S. Pat. No. 5,860,353 to Ceccarani discloses an apparatus for accelerating the aging of alcoholic beverages. The apparatus exposes beverages to low-frequency polarized pulsating magnetic fields.

One shortcoming with several of these devices is that the container with its integral magnets must contact the beverage to be treated. In other words, the user must pour the beverage to be treated into the specialized container for treatment prior to consuming the beverage. These specialized containers may increase the cost of magnetically treating beverages and may also decrease consumer flexibility.

Significant advances in the area of magnetically treating materials are disclosed in U.S. Pat. Nos. 6,959,640; D511,198; D500,118; and Published U.S. Patent Application No. 2007/0108144 and assigned to Omega Patents, L.L.C., the assignee of the present invention, the entire contents of which are incorporated herein by reference. Some users may still desire a treatment device that provides additional features.

SUMMARY OF THE INVENTION

In view of the foregoing background, it is therefore an object of the present invention to provide a treatment device for magnetically treating liquids that provides the user with additional features.

This and other objects, features, and advantages in accordance with the present invention are provided by a treatment device for magnetically treating liquid in a liquid container comprising a container holder to receive the liquid container and an active cooling unit associated with the container holder to cool the liquid within the liquid container. At least one magnet may be associated with the container holder to generate a magnetic field within the liquid in the liquid container. This provides the user with the ability to simultaneously magnetically treat and chill liquid in a liquid container.

The container holder may have a base, a sidewall extending upwardly, and an open upper end sized to receive the liquid container. The sidewall may be cylindrically shaped. Furthermore, the sidewall may also include thermally insulating material.

In some embodiments, the at least one magnet may be carried by the base. The at least one magnet may also be carried by the sidewall. Moreover, the active cooling unit may comprise an electrically powered active cooling unit.

A treatment timer may be associated with the container holder. The treatment timer may comprise timer circuitry and at least one switch cooperating therewith to assist a user in timing a duration of treatment of liquid within the liquid container. Additionally, at least one of a visual indicator and an audible indicator may be coupled to the treatment timer.

The at least one magnet may comprise at least one permanent magnet. The at least one magnet may also be at least one electromagnet. In some embodiments, the at least one magnet may comprise a plurality of magnets.

Another embodiment is directed to a method of making a treatment device for magnetically treating liquid in a liquid container. The method may comprise configuring a container holder to receive the liquid container and associating an active cooling unit with the container holder to cool the liquid within the liquid container. Furthermore, the method may comprise associating at least one magnet with the container holder to generate a magnetic field within the liquid in the liquid container.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
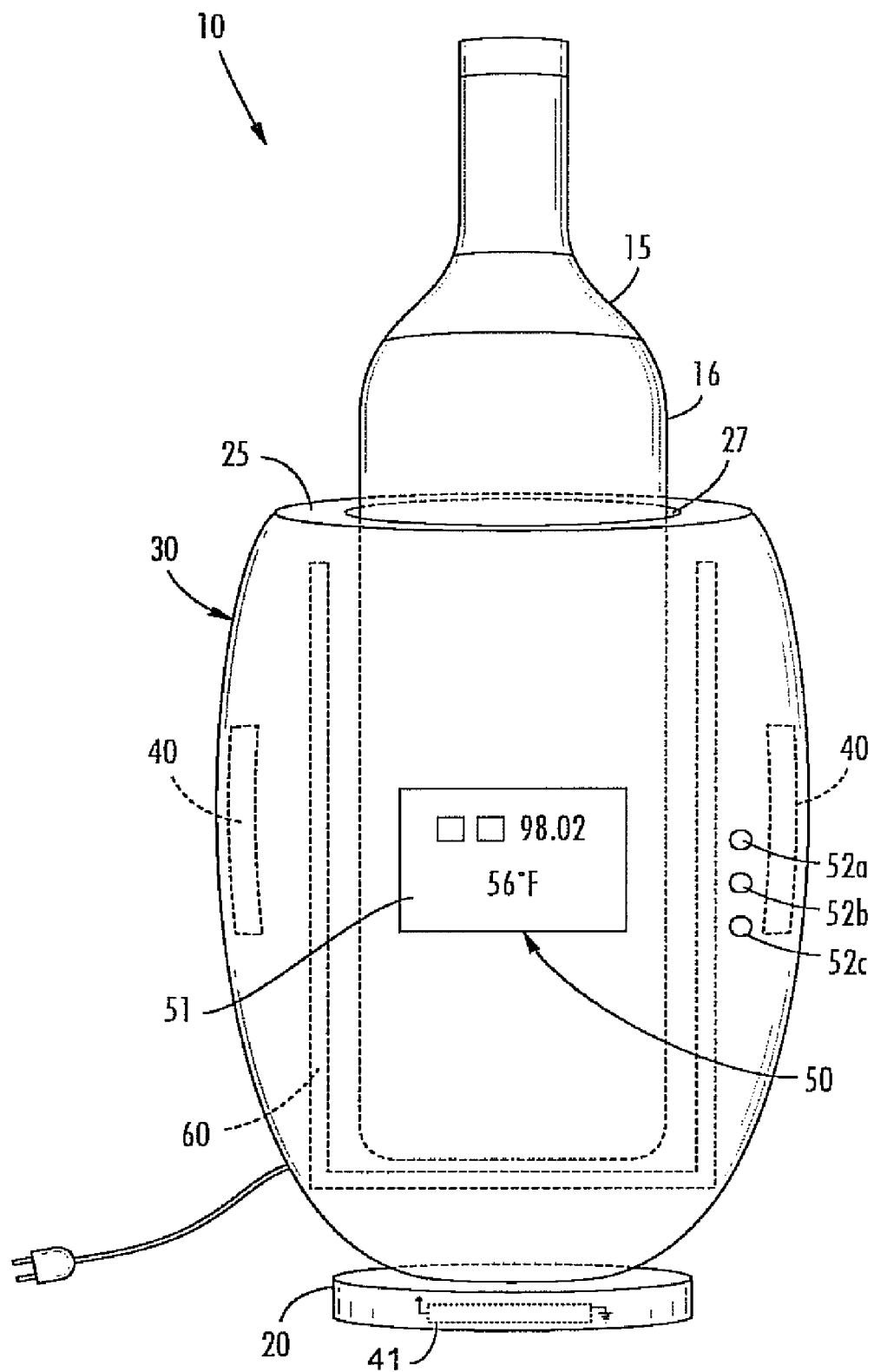
FIG. 1 is a front perspective view of a treatment device in accordance with the present invention.
Figure 2:
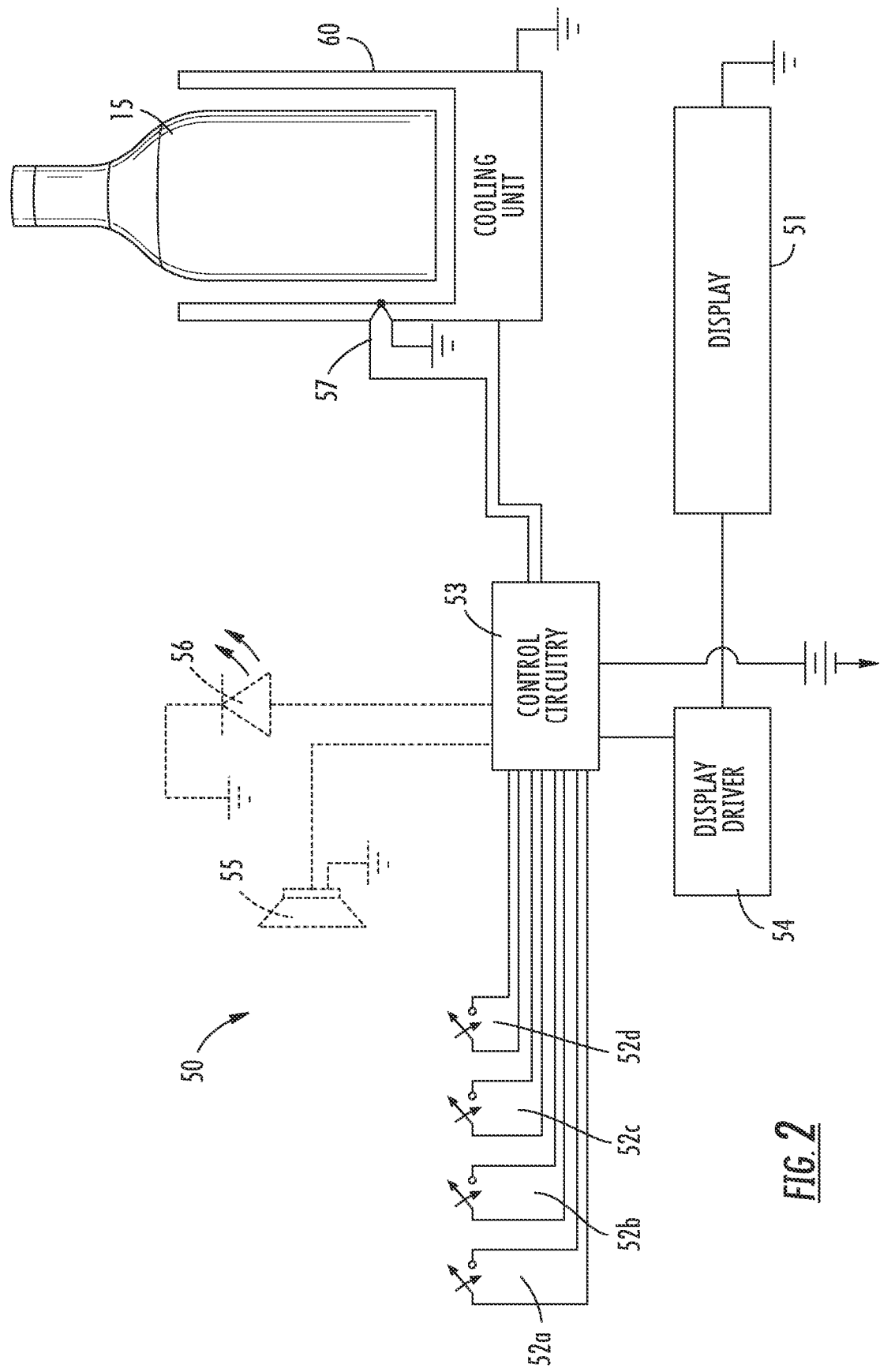
FIG. 2 is a schematic block diagram of the treatment device of FIG. 1.

Referring now to FIGS. 1 and 2, a treatment device 10 for magnetically treating liquid 16 in a liquid container 15 is now described. It will be readily understood by those skilled in the art that the liquid 16 may be a beverage, for example, or any other type of liquid as will be discussed in greater detail below.

The treatment device 10 illustratively includes a container holder 30 to receive the liquid container 15. The container holder 30 has a base 20, a sidewall extending upwardly 25, and an open upper end 27 sized to receive the liquid container 15. Additionally, in other embodiments, for example, there may be more than one liquid container 15 that can be treated simultaneously by the same treatment device 10.

The base 20 illustratively has a cylindrical shape. In other embodiments, the base 20 could be any shape, for example, rectangular, triangular, etc. The open upper end 27 is cylindrically shaped to receive the liquid container 15. It will be understood by those skilled in the art that, in other embodiments, the open upper end 27 could be any shape, for example, rectangular, triangular, etc.

Additionally, the sidewall 25 includes thermally insulating material. The thermally insulating material may comprise polystyrene or other plastic foam material, for example. The sidewall 25 illustratively has a bulbous shape, although it is to be understood that, in other embodiments, the sidewall could have any other shape, for example cylindrical, rectangular, etc.

An active cooling unit 60 is associated with the container holder 30 to cool the liquid 16 within the liquid container 15. The active cooling unit 60 may cool the liquid 16 through thermoelectric cooling. Alternately, the active cooling unit 60 may cool the liquid 16 through the conventional vapor-compression cycle, used in common household refrigerators, or through any other method of cooling. The active cooling unit 60 may be electrically powered via a wall plug, a 12v automobile plug, or a battery, for example.

A plurality of magnets 40 are associated with the container holder 30 to generate a magnetic field within the liquid 16 in the liquid container 15. It is to be understood that, in other embodiments, there may be only a single magnet 40. The magnets 40 may comprise permanent magnets. For example, the permanent magnets 40 may comprise neodymium, but may be provided by any magnetic material, such as a ceramic block magnet, alnico, and samarium cobalt, as understood by those skilled in the art. Electromagnets could be used in some other embodiments, as will be appreciated by those skilled in the art. Electromagnets could be electrically powered by the same source that powers the active cooling unit 60 or could be electrically powered by another source.

The magnets 40 are illustratively carried by the sidewall 25. Additionally or alternatively, an electromagnet 41 (or permanent magnets) may be carried by the base 20. The magnets 40 or the electro magnet 41 may, in some applications, be carried by the active cooling unit 60, or any other portion of the treatment device 10.

The liquid container 15 may, for example, be a plastic container, bottle, or any other non-ferrous container that permits the magnetic field generated by the magnet 40 to penetrate therethrough and into the liquid 16. The device 10 could be sized to treat liquid 16 in any type of liquid container 15, as understood by those skilled in the art. In cases where the device 10 is used to magnetically treat a beverage, the liquid container 15 may, for example, be a standard 12-ounce aluminum can, a wine bottle, a liquor bottle, a juice box, a milk carton, or any other type of non-ferrous container that permits the magnetic field to penetrate into the liquid 16 in the liquid container 15 as understood by those skilled in the art.

The device 10 may be used to enhance the flavor of alcoholic beverages, but may also be used to enhance the flavor of citrus juice and dairy products, for example. It will be understood by those skilled in the art that a beverage includes any liquid consumable substance, such as the above-referenced citrus juice, dairy products, and alcoholic beverages as well as sauces and soups, for example.

A treatment timer 50 is associated with the container holder 30 to time a duration of treatment of liquid 16 within the liquid container 15. The treatment timer 50 may additionally function as a clock or a stopwatch. The treatment timer 50 may time the duration the liquid container 15 has been in the container holder 30. The treatment timer 50 may count upward to a designated treatment time. Alternatively, the treatment timer 50 may count downward from a designated treatment time.

The designated treatment time may be user programmable, for example. There may be different selectable values that correspond to different liquids, so that a user could select wine, for example, and the treatment timer would count upward to or downward from the set value for wine treatment. Alternatively, there may be different user selectable values that do not correspond to different liquids, but rather are set periods of time (ie. 8 hours or 16 hours). The user may select whether the treatment timer counts upward or downward, for example The treatment timer 50 illustratively includes an indicator in the form of a visual indicator 51 to display the duration of treatment. It will be understood by one skilled in the art that the indicator could, in alternative embodiments, additionally or alternatively comprise an audible indicator, a tactile indicator, or any other type of indicator. The indicator may indicate that treatment has begun or that no treatment time remains and the liquid is ready for use or consumption.

The visual indicator 51 may be considered as generating visual interest and entertainment for the user. The visual indicator 51 may display at least one of days, hours, minutes, seconds, and milliseconds. The visual indicator 51 may display incrementing or decrementing values of the days, hours, minutes, seconds, and milliseconds to indicate the treatment time. Moreover, the visual indicator 51 may display the time of the day when not being used as a timer for treatment.

In some embodiments, the visual indicator may display the temperature of the active cooling unit 60, of the liquid 16 within the liquid container 15, or of the ambient temperature. It is to be understood that the temperature could be displayed in any system of measurement, for example Fahrenheit, Celsius, or Kelvin. Moreover, the temperature could be displayed in at least fractions of a degree.

The treatment timer 50 has switches 52a, 52b, 52c to assist a user in timing a duration of treatment of liquid 16 within the liquid container 15. Moreover, the switches 52a-52c may assist a user in selecting a temperature to chill the active cooling unit 60 to, or a temperature to chill the liquid 16 within the liquid container 15 to. The switches 52a-52c may be manually activated or may be activated by proximity, light or darkness, sounds, or any other method of switch activation.

Switch 52a is start/stop switch to start or stop the timing of the duration of treatment. Switch 52b is a pause switch to pause the timing of the duration of treatment. Switch 52c is a reset switch to reset the timing of the duration of treatment.

It will be understood by those skilled in the art that the treatment timer 50 may have any number of switches 52a-52c or that the treatment timer may have no switches, in some embodiments. The switches 52a-52c may have other additional functions than those listed above, for example a clock switch to display the time of the day. The switches 52a-52c may permit programming to enable a user to choose a set treatment time, or the switches may enable the user to designate any treatment time he would like. The switches 52a52c may select whether the treatment timer 50 counts upward to a designated treatment time or whether the treatment timer counts downward from a designated treatment time. The switches 52a-52c may turn the indicator on or off or may alter properties of the indicator such as volume, color, font, language, or brightness.

The switches 52a-52c are illustratively carried by the sidewall 25. It is to be understood that the switches 52a-52c could be carried by any portion of the treatment device 10 in some embodiments, for example, the base 20.

The treatment timer 50 includes control circuitry 53. A display driver 54 is coupled to the control circuitry 53. In some embodiments, the active cooling unit 60 is coupled to the control circuitry. The visual indicator 51 is coupled to the display driver 54. Manually activated switches 52a, 52b, and 52c are coupled to the control circuitry 63. Present in some embodiments may be an audio indicator 55 coupled to the control circuitry 53 to alert the user. Likewise, some embodiments may include a visual indicator 56, comprising a light coupled to the control circuitry 53.

Other embodiments utilizing the treatment timer 50 are disclosed in the co-pending application entitled Magnetic Liquid Treatment Device Including Timer And Associated Methods, Attorney Docket No. 58256, which is incorporated herein by reference in its entirety. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A treatment device for magnetically treating liquid in a liquid container comprising:
    a container holder to receive the liquid container;
    an active cooling unit associated with said container holder to cool the liquid within the liquid container;
    at least one magnet associated with said container holder to generate a magnetic field within the liquid in said liquid container; and
    a treatment timer associated with said container holder.

2. A treatment device according to claim 1 wherein said container holder comprises a base, a sidewall extending upwardly from said base, and an open upper end sized to receive the liquid container.

3. A treatment device according to claim 2 wherein said sidewall is cylindrically shaped.

4. A treatment device according to claim 2 wherein at least said sidewall comprises thermally insulating material.

5. A treatment device according to claim 2 wherein said at least one magnet is carried by said base.

6. A treatment device according to claim 2 wherein said at least one magnet is carried by said sidewall.

7. A treatment device according to claim 1 wherein said active cooling unit comprises an electrically powered active cooling unit.

8. A treatment device according to claim 1 wherein said treatment timer comprises timer circuitry and at least one switch cooperating therewith to assist a user in timing a duration of treatment of liquid within the liquid container.

9. A treatment device according to claim 8 further comprising at least one of a visual indicator and an audible indicator coupled to said treatment timer.

10. A treatment device according to claim 1 wherein said at least one magnet comprises at least one permanent magnet.

11. A treatment device according to claim 1 wherein said at least one magnet comprises at least one electromagnet.

12. A treatment device according to claim 1 where said at least one magnet comprises a plurality of magnets.

13. A treatment device for magnetically treating liquid in a liquid container comprising:
    a container holder comprising a base, a sidewall extending upwardly from said base, and an open upper end sized to receive the liquid container;
    an active cooling unit associated with said container holder to cool the liquid within the liquid container;
    at least one electromagnet associated with said container holder to generate a magnetic field within the liquid in said liquid container; and
    a treatment timer associated with said container holder.

14. A treatment device according to claim 13 wherein said at least one electromagnet is carried by said base.

15. A treatment device according to claim 13 wherein said at least one permanent magnet is carried by said sidewall.

16. A treatment device according to claim 13 wherein said treatment timer comprises timer circuitry and at least one switch cooperating therewith to assist a user in timing a duration of treatment of liquid within the liquid container.

17. A treatment device according to claim 13 further comprising at least one of a visual indicator and an audible indicator coupled to said treatment timer.

18. A method of making a treatment device for magnetically treating liquid in a liquid container, the method comprising:
    configuring a container holder to receive the liquid container;
    associating an active cooling unit with the container holder to cool the liquid within the liquid container;
    associating at least one magnet with the container holder to generate a magnetic field within the liquid in the liquid container; and
    associating a treatment timer with the container holder.

19. A method according to claim 18 wherein configuring the container holder comprises forming a base, a sidewall extending upwardly from said base, and an open upper end sized to receive the liquid container.

20. A method according to claim 19 wherein at least the sidewall comprises thermally insulating material 21. A method according to claim 19 wherein associating at least one magnet with the container holder comprises associating at least one magnet with the base.

22. A method according to claim 19 wherein associating at least one magnet with the container holder comprises associating at least one magnet with the sidewall.

23. A method according to claim 18 wherein associating the active cooling unit comprises associating an electrically powered active cooling unit with the container holder to cool the liquid within the liquid container.

* * * * *